(No Model.)

D. L. MILLER.
VEHICLE BRAKE.

No. 523,480. Patented July 24, 1894.

Witnesses
A. C. Burdick.
G. Arthur Pennington

Inventor
Daniel L. Miller
By L. S. Bacon
Attorney

UNITED STATES PATENT OFFICE.

DANIEL L. MILLER, OF MEYERSDALE, PENNSYLVANIA, ASSIGNOR OF ONE-FOURTH TO FRANK W. HOBLITZELL, OF SAME PLACE.

VEHICLE-BRAKE.

SPECIFICATION forming part of Letters Patent No. 523,480, dated July 24, 1894.

Application filed October 28, 1893. Serial No. 489,344. (No model.)

*To all whom it may concern:*

Be it known that I, DANIEL L. MILLER, a citizen of the United States, residing at Meyersdale, in the county of Somerset and State of Pennsylvania, have invented certain new and useful Improvements in Vehicle-Brakes; and I do hereby declare the following to be a full, clear, and exact description of the invention, such as will enable others skilled in the art to which it appertains to make and use the same.

This invention relates to an improvement in "vehicle brakes" and it consists in the construction and arrangement of parts hereinafter described and definitely pointed out in the claims.

The aim and purpose of the invention is the provision of an improved brake of the type known as "band" brakes, which will be exceedingly simple in its construction; effective in its operation and quick in action.

A further purpose is to provide an improved brake which will avoid the necessity of peripheral or tire contact with the wheel, and which will exert its power directly or approximate the center of the hub of the wheel.

These objects are attained by the construction illustrated in the accompanying drawings wherein like letters of reference indicate corresponding parts in the several views, and in which—

Figure 1:
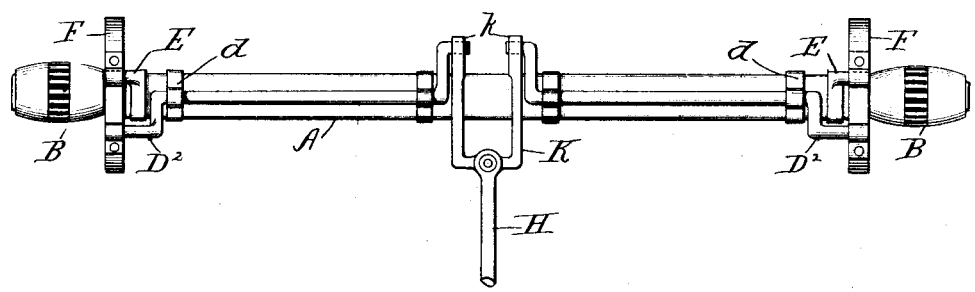
Figure 2:
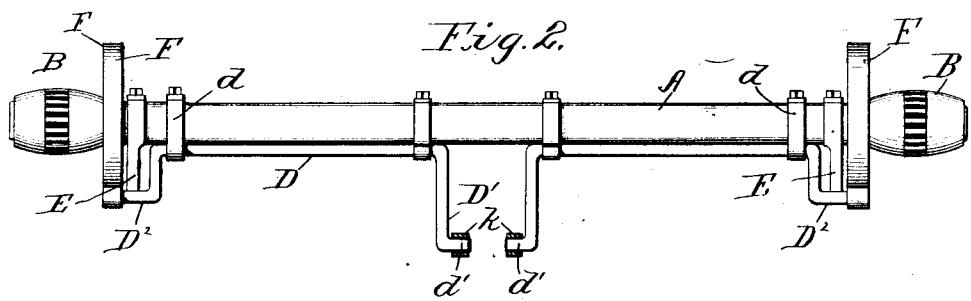
Figures 3, 4:
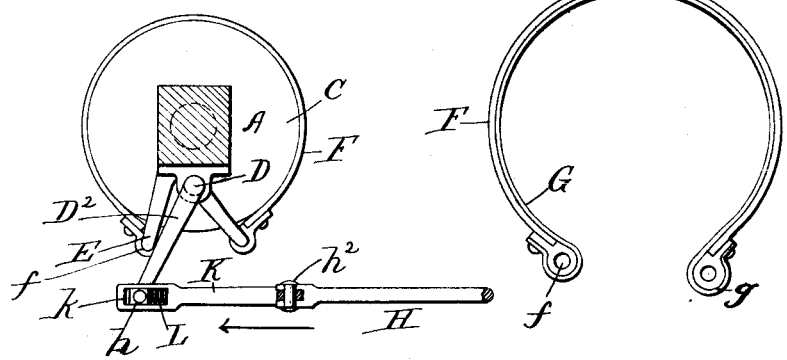

Figure 1 is a bottom plan view of an axle showing my improved brake applied thereto. Fig. 2 is an elevation thereof. Fig. 3 is a detail cross-section taken through the center, and Fig. 4 is a detail view of the friction brake.

In the drawings A represents the axle of a vehicle, B the wheel hubs and C the brake or friction disks secured on the inner ends of the hubs. These disks I have shown of a size considerably larger than the diameter of the hubs, but it is to be understood that their sizes may be materially increased or decreased.

Heretofore in the employment of this type of brakes it has been found that the friction bands will soon wear out and become broken. Again it has been practically impossible to make a uniform application of the brake owing to the wear or unequal adjustment. To overcome these objections I employ the following instrumentality.

D represents the brake rods having the crank levers D' at their inner ends, and the brake cranks $D^2$ at their outer ends arranged at an obtuse angle to the inclination or angle of the brake cranks. The rods are journaled in suitable clips $d$ on the axle and extend from points near the center to near the hubs. The length of the crank levers being materially longer than the length of the brake cranks, so that a more powerful leverage may be had.

E represents a stud or horn rigid on the axle and extending over the disk and in close proximity to its periphery.

F represents the friction brake band, having the eye $f$ in one end through which the horn passes. The opposite end of the band has a corresponding eye through which the end of the brake crank passes.

G represents a supplemental or contact shoe detachably secured on the brake band by having its ends looped or formed into spring clips $g$, overlapping the eyes and bolted, or held in place by frictional contact. The purpose of this band is to act as a shoe, and owing to its manner of mounting it may be quickly removed and replaced without interfering with the rest of the mechanism or devices. This I regard as an essential feature of my invention.

H is the connecting bar which extends to the actuating lever located at any desired point on the vehicle.

The cranks D' have their outer ends bent at right angles as at $d'$ and approach each other. These ends $d'$ are journaled in sliding blocks $h$ fitted in elongated slots $k$ in a clevis K which latter is of the usual U-shape and has the connecting bar H pivotally secured thereto at $h^2$.

To secure an equalizing effect on both brake bands, I place in the slots $k$ in front of the blocks $h$ the coiled springs L, the ends of which abut against the ends of the blocks and end wall of the slot, as shown in Fig. 3. By this means as pressure is placed on the bar H, the clevis is forced back moving the cranks D' and eccentrically moving the cranks $D^2$ which will draw the band F onto the disk with great force. As the clevis is moved back, the pivotal connection between the same and bar H will permit a rocking motion and should one of the shoes be worn, the pressure, which is in the direction of the arrow, Fig. 3, would be equalized by the springs L. That is to say, if the pressure were exerted on one lever before the other, the spring of that lever would be compressed and tend to rock the clevis or compress and equalize the pressure on the opposite spring. Further, the employment of the springs serves to hold the brakes in place which would otherwise be affected by vibration of the parts of the vehicle.

I am aware that many minor changes in the construction and arrangement of the parts of my device can be made and substituted for those herein shown and described without in the least departing from the nature and principle of the invention.

Having thus described my invention, what I claim as new, and desire to secure by Letters Patent, is—

1. In a vehicle brake, a friction disk, a friction band encircling the disk, means for setting the brake and a detachable auxiliary contact band on the friction band having its ends looped outwardly over the same, substantially as described.

2. In a vehicle brake, the combination with a friction or braking disk, of a band surrounding the same, and a shoe having spring clips at its ends looped over the ends of the band, substantially as described.

3. In a vehicle brake, the combination with a brake actuating mechanism, and a band brake, of a sliding connection in the mechanism and equalizing springs on the sliding connection, substantially as described.

4. In a vehicle brake, the combination with the brake, of the levers therefor, a clevis having elongated slots therein, sliding blocks in the slots in which the ends of the levers are placed, springs in the slots engaging the blocks, and an actuating bar pivotally connected to the clevis, substantially as described.

In testimony whereof I affix my signature in presence of two witnesses.

DANIEL L. MILLER.

Witnesses:
   WM. B. COOK,
   H. M. COOK.